Dec. 22, 1931.   P. FENAILLE   1,837,856

UNIVERSAL COUPLING

Filed Oct. 25, 1930    4 Sheets-Sheet 1

Pierre Fenaille
INVENTOR,
By [signature]
his Attorney.

Dec. 22, 1931. P. FENAILLE 1,837,856
UNIVERSAL COUPLING
Filed Oct. 25, 1930 4 Sheets-Sheet 2

Pierre Fenaille
INVENTOR

Dec. 22, 1931.  P. FENAILLE  1,837,856
UNIVERSAL COUPLING
Filed Oct. 25, 1930  4 Sheets-Sheet 3
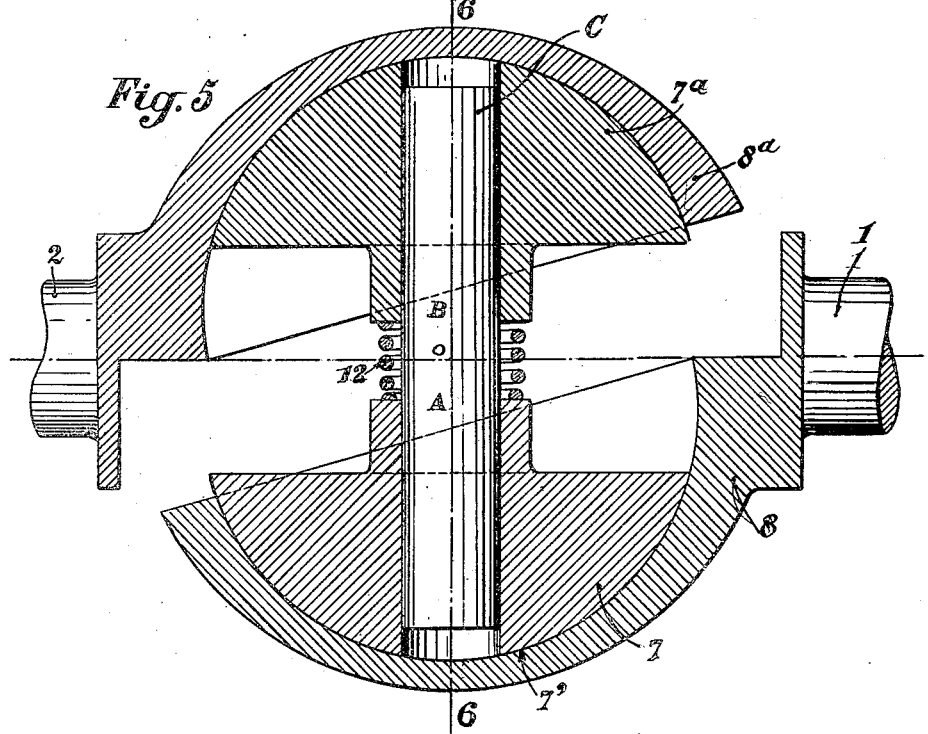
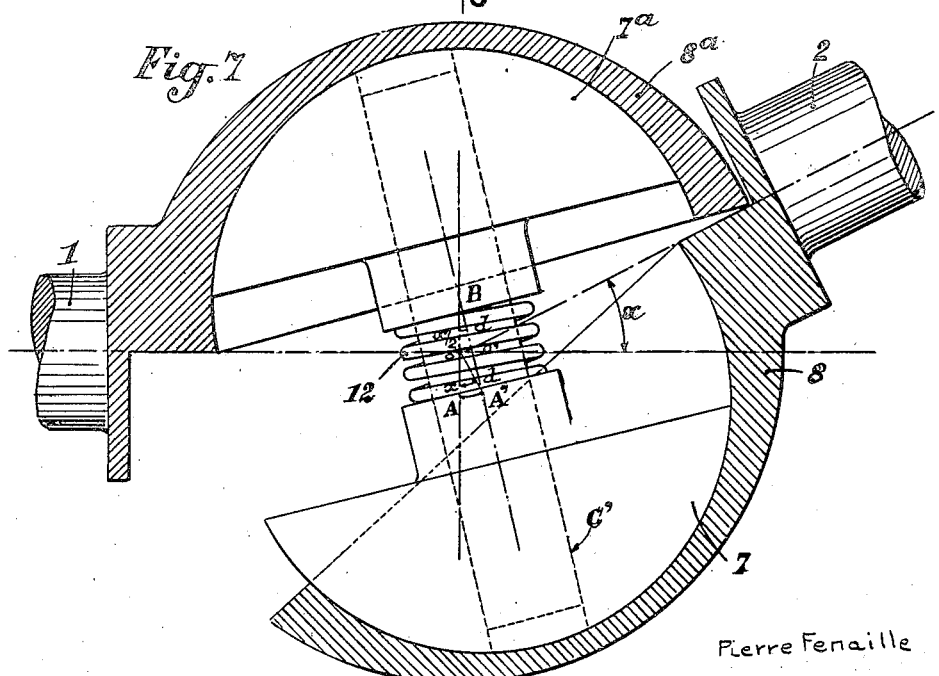
Pierre Fenaille
INVENTOR
By
his Attorney Dec. 22, 1931. P. FENAILLE 1,837,856
UNIVERSAL COUPLING
Filed Oct. 25, 1930   4 Sheets-Sheet 4

Pierre Fenaille
INVENTOR
By
his Attorney.

Patented Dec. 22, 1931

1,837,856

UNITED STATES PATENT OFFICE

PIERRE FENAILLE, OF PARIS, FRANCE

UNIVERSAL COUPLING

Application filed October 25, 1930, Serial No. 491,142, and in France December 6, 1929.

The invention relates to universal couplings having two Cardan joints whereby the angular speed of the driven shaft is constantly equal to the angular speed of the driving shaft, at any instant. In the universal couplings of this type, both the driving and driven shafts are respectively adapted to pivot about two parallel axes, termed "primary axes" on parts which in turn are pivoted to each other about an axis termed "intermediate axis", and, in order to constantly obtain equal angular speeds of the shafts, said intermediate axis is kept in the plane bisecting the angle formed between the driving shaft and the driven shaft, at right angles with the plane containing the axes of both shafts.

In the known devices of this type, the "primary axes" are located on either side of said bisecting plane. Such an arrangement involves constructional difficulties and is further objectionable in that the length or longitudinal bulk of the joint is excessive, it being increased by the sum of the distances from said primary axes to said bisecting plane.

The present invention has for its object to provide a universal joint with double Cardan joint, which will be of compact construction and reduced bulk.

According to an important feature of the invention, the arrangement is such that the parallel primary axes about which the driving and driven shafts are respectively adapted to pivot are located in the bisecting plane of the angle formed by said shafts and are equidistant from the virtual intersecting point of the longitudinal axes of said shafts.

According to one embodiment of the invention, the universal coupling comprises two fork pieces, or the like, having tail portions coaxially arranged on an axis passing through the point of intersection of the shaft axes and capable of mutual relative longitudinal and rotary motions, each shaft being rotatably connected with a corresponding fork piece about a primary axis crossing the axis of rotation of said tail portions, said primary axes being equidistant from said point of intersection.

According to another embodiment of the invention, the universal coupling comprises two sectors slidable along and rotatable about an intermediate axis passing through the point of intersection of the shaft axes, and over which end pieces carried by the shafts are caused to slide in a circular path about primary axes, crossing said intermediate axis, and equidistant from said point of intersection, said sectors being pressed against the end pieces of said shafts by means of a spring or any other suitable means.

In the accompanying drawings, which are given solely by way of illustration:

Fig. 5 is a sectional view of a modification of the invention.

Figure 3:
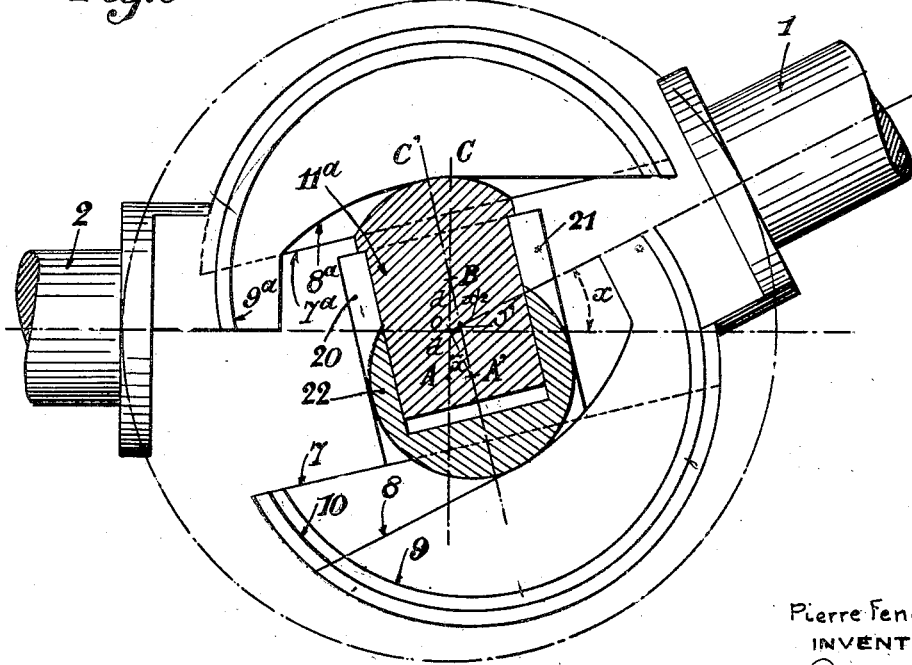
Fig. 3 is a sectional view on line 3—3 of Fig. 2, the shafts forming an angle $x$.
Figure 4:
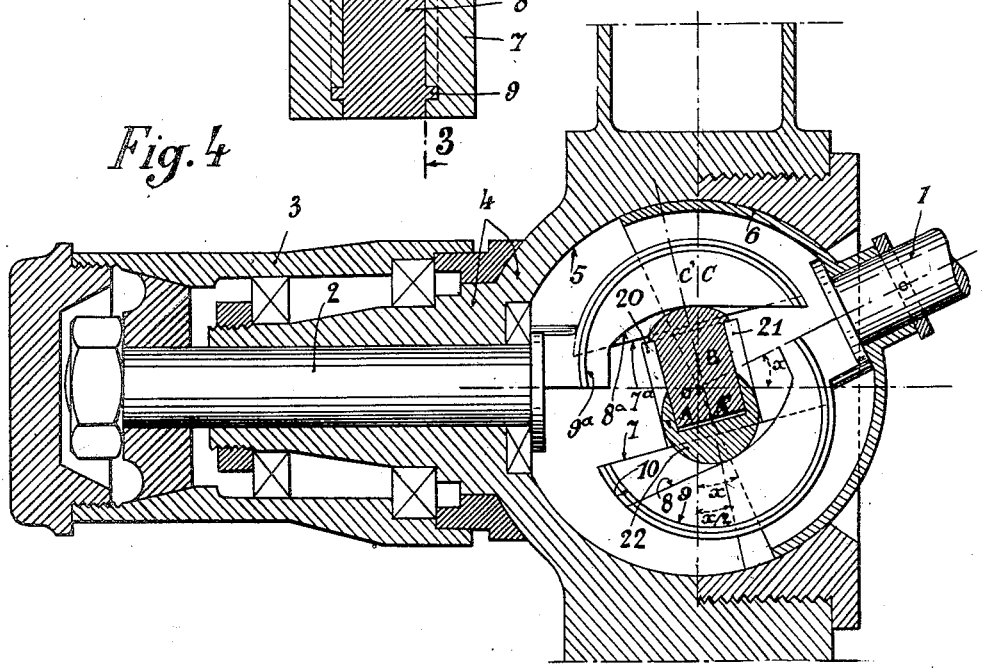
Fig. 4 is a longitudinal section of a universal coupling as mounted on a motor vehicle for transmitting power to forward driving wheels.
Figure 6:
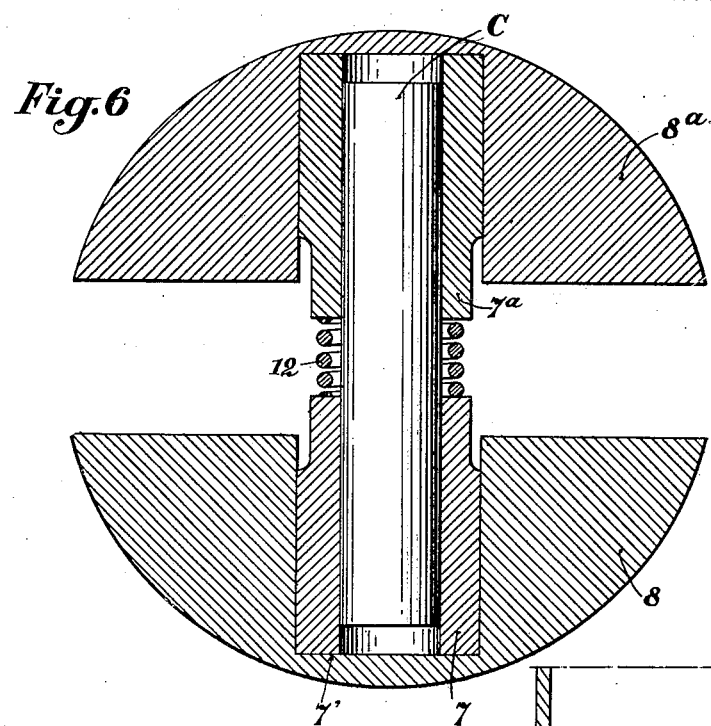
Fig. 6 is a sectional view on line 6—6 of Fig. 5.
Figure 8:
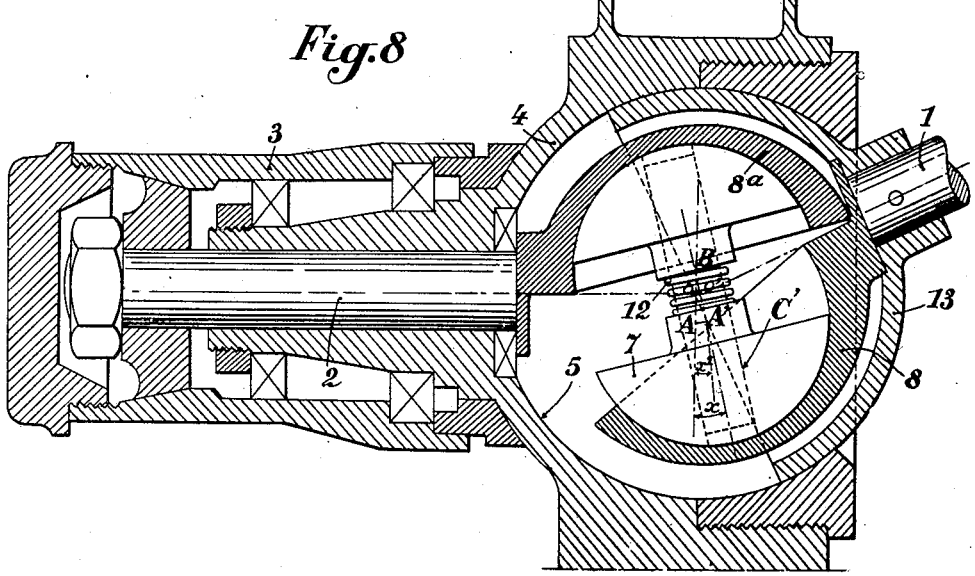

Figs. 7 and 8, which correspond respectively to Figs. 3 and 4, illustrate also a modification of the invention.

Figure 1:
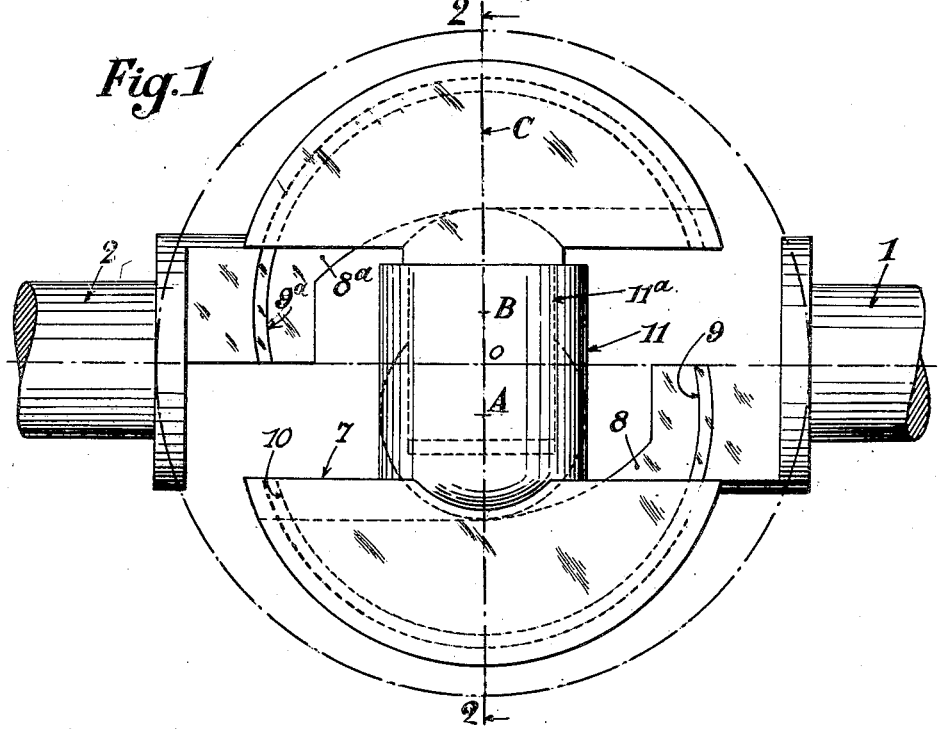
Fig. 1 is an elevation view of a joint according to one embodiment of the invention, the driving and driven shafts being coaxial.
Figure 2:
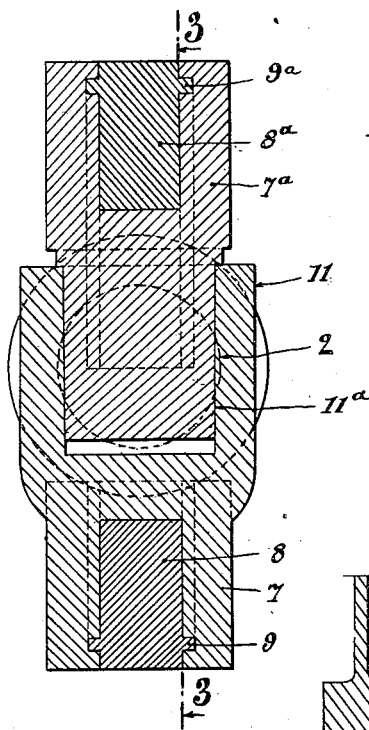
Fig. 2 is a sectional view on the line 2—2 of Fig. 1.

In the example shown in Figs. 1 to 3, 1 is a driving shaft having an end piece 8 in the shape of a sector offset with respect to the shaft axis. Both faces of sector 8 are engaged by a fork member 7, having sector-shaped branches having on their inner faces a circular groove 10 cooperating with circular tongues 9 formed on both faces of sector 8. The centre of the circular tongues and grooves is on an axis A.

In the same manner, shaft 2 carries a sector-shaped end-piece 8ᵃ provided on both faces with circular tongues 9ᵃ slidable in respective circular grooves 10ᵃ formed on the inner faces of another fork-member 7ᵃ having sector-shaped branches. The centre of the tongues 9ᵃ and grooves 10ᵃ is located on the primary axis B.

The fork members 7 and 7ᵃ are provided with coaxial tail-portions 11 and 11ᵃ, tail-portion 11ᵃ forming a pin rotatably and slidably mounted in the other tail-piece 11, in the shape of a sleeve. The common axis C of both tail-pieces, which is at right angles with the primary axes A and B, constitutes the intermediate axis of the double universal coupling.

As hereinafter explained, the axes of shafts 1 and 2 are caused to meet together at a point O of axis C.

Due to the shape of members 8 and 8ᵃ, the primary axes A and B are at the same distance $d$ (Figs. 3 and 4) from the said point O.

In order to permit angular movement of sufficient amplitude between sector 8 and fork 7, sleeve 11 is cut out between the branches of fork 7 as shown at 20 and 21, in order to leave only a circular solid central part on which the inner edge of sector 8 will ride in the rotation thereof relatively to fork 7.

In order that the axes of shafts 1 and 2 should meet at a point O of axis C, which should remain stationary, although one or both of the shafts may be free to swing with respect to the other, provision may be made, for example, of the arrangement shown in Figure 4, which illustrates an embodiment of the invention for the transmission of power to front driving wheels of a motor vehicle. In this example, my improved universal joint serves to connect the driving shaft 1 to the driven shaft 2 on which is fastened the hub of the wheel. Shaft 2 is carried by the steering swivel 4, and is locked axially therein. Said swivel which may swing about a vertical axis has a spherical recess 5 in which is rotatable a spherical shell 6 secured to shaft 1. Due to this kind of ball and socket connection, the intersecting point O of axes 1 and 2 is constantly maintained at the centre of spherical recess 5.

It will be apparent that each shaft may assume any angular position since it is rotatable about two perpendicular axes. Further, both shafts 1 and 2 will always rotate at equal angular speeds, as hereunder explained: suppose that shaft 2 has a fixed direction (Figs. 3 and 4) and that shaft 1 undergoes an angular motion of an amplitude $x$ about point O; all points bound to shaft 1 will describe circular arcs about point O, said arcs having the same angle $x$. Primary axis A will come to A'. Axis B, bound to sector 8ᵃ and shaft 2 will not move. Intermediate axis C, which is at right angles with and in the same plane as axes A and B, will come to C'. Both axes A and B being at the same distance $d$ from the centre, angle ABA' (Figs. 3 and 4) will be equal to one half angle AOA' that is $$\frac{x}{2}.$$

Except for the slight displacement OO', which is negligible, intermediate axis C will thus remain in the plane bisecting angle $\pi-x$ formed by the two shafts 1 and 2. This is the necessary and sufficient condition required to insure constant evenness of the angular speeds of both shafts 1 and 2.

It will be observed that distance A'B (Figs. 3 and 4) is smaller than AB, that is AB decreases as and when angle $x$ increases. This is permitted by the sliding connection of pin 11ᵃ with sleeve 11. A spring may be interposed between said pin and said sleeve for moving apart the two fork-members 7, 7ᵃ when angle $x$ decreases, in order to relieve the parts from excessive stresses, namely the tongues 9 and 9ᵃ and grooves 10 and 10ᵃ.

Figs. 5 to 8 illustrate a modified form of the invention, as applied to the drive of the front wheels of a motor-vehicle.

As in the embodiment above described, shaft 1 is rotatable about a primary axis A, represented by the axis of the cylindrical surface 7' of a sector member 7. Member 7 fits in a recess of the same shape formed in a semi-spherical member 8 rigid with shaft 1, in a plane including the axis of said shaft. Member 8 is adapted to slide over sector 7, thus rotating about axis A, the cylindrical face of sector 7 and the cylindrical end face of the recess in member 8 being constantly held in contact as explained hereunder.

In a similar manner, shaft 2 carries a semi-spherical member 8ᵃ adapted to slide over a sector member 7ᵃ, housed in a recess of member 8. The axis of sector member 7ᵃ constitutes the second primary axis B.

Due to the shape of members 8 and 8ᵃ, the primary axes A and B are at an equal distance $d$ (Figs. 7 and 8) from the point of intersection O of the longitudinal axes of both shafts 1 and 2.

Circular sectors 7 and 7ᵃ are bored radially in their middle so as to receive a common pin C slidably and rotatably mounted in the bores of sectors 7 and 7ᵃ. A spring 12, fitting over said pin C and held between sectors 7 and 7ᵃ, presses the latter against the bottom of the recesses in members 8 and 8ᵃ. Pin C, which is common to sectors 7 and 7ᵃ and at right angles with primary axes A and B, constitutes the intermediate axis of the double universal coupling.

The operation of this mechanism is identical with that already described.

Such device is of extremely simple construction, since it consists only of a pivot pin C, of two sets of identical members 7—7ª and 8—8ª, and of a spring 12.

Of course, the invention is in no way limited to the embodiments herein illustrated and described which are only selected for the sake of illustration.

Having now described my invention what I claim as new and desire to secure by Letters Patent is:

1. In a universal joint, two rotary members, means for causing the axes of said members to meet at a fixed point, joint means pivoted to said rotary members about two distinct axes meeting a straight line passing substantially through said fixed point and bisecting the angle formed by the axes of said rotary members, said distinct axes being at right angles with said straight line and equally spaced from said fixed point.

2. In a universal joint, two rotary members, joint means pivoted to said rotary members about two parallel axes, and means for holding the parts in such relation that a line perpendicular to said axes passes substantially through the point of intersection of the axes of said rotary members and bisects the angle formed thereby, said parallel axes being equally spaced from said point of intersection.

3. In a universal coupling, two rotary members, two coaxial joint members, a telescopic connection between the latter, pivotal connections between said joint and rotary members, whereby the latter are adapted to rotate on the former about pivot axes at right angles with the common axis of said joint members, and means whereby said latter axis is caused to pass substantially through the point of intersection of the axes of said rotary members and to bisect the angle formed by the latter, said pivot axes being equally spaced from said point of intersection.

4. In a universal coupling, two rotary members, two coaxial joint members, a rotary and telescopic connection between the latter, pivotal connections between said joint and rotary members whereby the latter are adapted to rotate on the former about pivot axes at right angles with the common axis of said joint members, and means whereby said latter axis is caused to pass substantially through the point of intersection of the axes of said rotary members and to bisect the angle formed by the latter, said pivot axes being equally spaced from said point of intersection.

5. In a universal coupling, two rotary members, two coaxial joint members, a telescopic connection between the latter, pivotal connections between said joint and rotary members, whereby the latter are adapted to rotate on the former about pivot axes at right angles with the common axis of said joint members, a spherical housing locked axially with respect to one rotary member, and a hollow spherical member locked axially with respect to the other rotary member and fitting exactly within said housing, the arrangement of the parts within the ball-and-socket connection thus formed being such that the axes of said rotary members and the axis of said joint parts are caused to pass substantially through the centre of the sphere, and said last-mentioned axis is caused to bisect the angle formed by the axes of said rotary members.

6. In a universal coupling, two rotary members, two joint members, a rotary and telescopic connection between the latter, a connection between said rotary members and the respective joint members, embodying mating forks and sectors for causing relative rotations about pivot axes at right angles with the common axis of said joint members, and means whereby said latter axis is caused to pass substantially through the point of intersection of the axes of said rotary members and to bisect the angle formed by the latter, said pivot axes being equally spaced from said point of intersection.

7. A universal coupling as claimed in claim 6, wherein one joint member has a trunnion adapted to slidably and rotatably engage a sleeve formed on the other joint member.

8. A universal coupling as claimed in claim 6, wherein said connection between said rotary-member and the respective joint member further comprises a circular tongue, engaging a circular groove, said tongues and grooves being formed on adjacent faces of said forks and sectors.

9. A universal coupling comprising in combination a spherical housing, two substantially semi-spherical rotary members, means for locking said rotary members radially with respect to said housing, sector shaped members engaging semi-cylindrical recesses in said rotary members, means for slidably and rotatably connecting said sector members on an axis passing through the centre of said housing, and resilient means for urging said sector members outwardly in said recesses.

10. A universal joint as claimed in claim 9, wherein said connecting means consist of a pivot pin engaging aligned bores in said sector members, said resilient means consisting of a spring coiled around said pin and bearing at its ends against said sector members.

In testimony whereof I have signed my name to this specification.

PIERRE FENAILLE.